US007007201B1

(12) United States Patent
Byrne et al.

(10) Patent No.: US 7,007,201 B1
(45) Date of Patent: Feb. 28, 2006

(54) SHARED EMBEDDED TRACE MACROCELL

(75) Inventors: Dayna A. Byrne, Rancho Santa Margarita, CA (US); Jeffrey J. Holm, Eden Prairie, MN (US)

(73) Assignee: LSI Logic Corporation, Milpitas, CA (US)

( * ) Notice: Subject to any disclaimer, the term of this patent is extended or adjusted under 35 U.S.C. 154(b) by 437 days.

(21) Appl. No.: 09/992,043

(22) Filed: Nov. 16, 2001

(51) Int. Cl.
*G06F 11/00* (2006.01)

(52) U.S. Cl. .............................. 714/27; 714/30; 714/31

(58) Field of Classification Search .................. 714/38, 714/27, 30, 31, 727
See application file for complete search history.

(56) References Cited

U.S. PATENT DOCUMENTS

| 5,406,525 | A   |   | 4/1995  | Nicholes                  |
|-----------|-----|---|---------|---------------------------|
| 5,956,477 | A   | * | 9/1999  | Ranson et al. ...... 714/30 |
| 5,978,902 | A   |   | 11/1999 | Mann                      |
| 6,055,492 | A   | * | 4/2000  | Alexander et al. ...... 702/179 |
| 6,065,078 | A   | * | 5/2000  | Falik et al. ...... 710/100 |
| 6,067,262 | A   |   | 5/2000  | Irrinki et al.            |
| 6,154,856 | A   | * | 11/2000 | Madduri et al. ...... 714/27 |
| 6,275,956 | B1  | * | 8/2001  | On et al. ...... 717/125  |
| 6,591,378 | B1  | * | 7/2003  | Arends et al. ...... 714/38 |
| 6,738,929 | B1  | * | 5/2004  | Swoboda et al. ...... 714/28 |
| 6,779,145 | B1  |   | 8/2004  | Edwards et al.            |
| 2001/0032305 | A1 | * | 10/2001 | Barry ...... 712/34      |
| 2003/0056154 | A1 | * | 3/2003  | Edwards et al. ...... 714/45 |

OTHER PUBLICATIONS

"Embedded Trace Macrocell Specification", pp. 1-1 to 7-18 (plus appendix and glossary).

* cited by examiner

*Primary Examiner*—Robert Beausoliel
*Assistant Examiner*—Yolanda L Wilson
(74) *Attorney, Agent, or Firm*—Christopher P. Maiorana, P.C.

(57) ABSTRACT

An apparatus generally comprising a plurality of processors, a trace circuit, and a connector circuit. The trace circuit may be configured to present information at a port for debugging software in a selected processor of the processors. The connector circuit may be configured to (i) couple the trace circuit to the selected processor in response to a select signal and (ii) transfer the information from the selected processor to the trace circuit while the selected processor is executing the software.

15 Claims, 3 Drawing Sheets

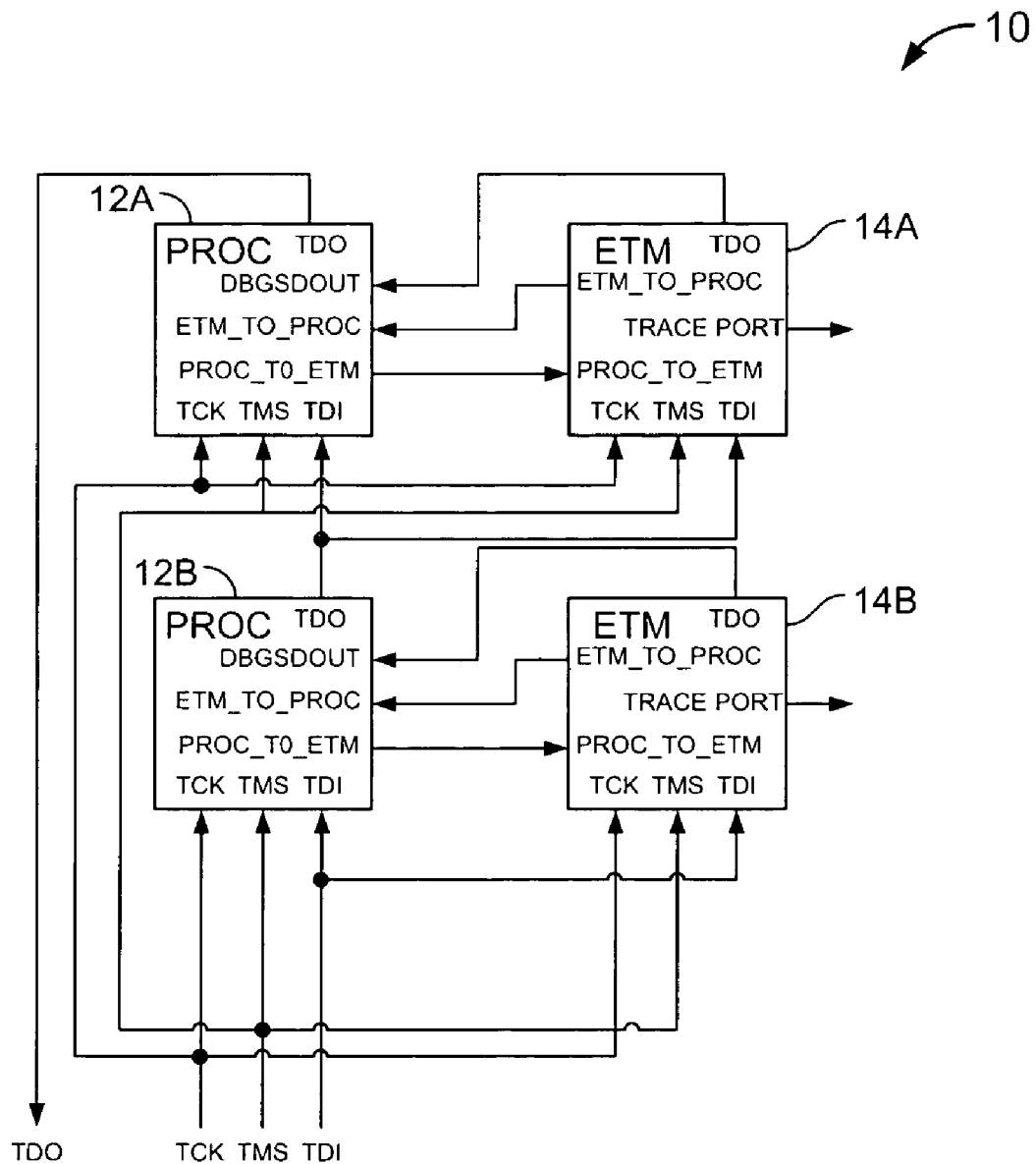
FIG.1
(CONVENTIONAL)

SHARED EMBEDDED TRACE MACROCELL

FIELD OF THE INVENTION

The present invention relates to a method and/or architecture for debugging software in embedded processors generally and, more particularly, to a method and/or architecture for real time debug via an external trace port.

BACKGROUND OF THE INVENTION

Debugging software in embedded processors is a difficult task. In order to assist software development, embedded processors conventionally have some sort of debug capability. For an ARM9 family of embedded microprocessors, there is an add-on module, called the Embedded Trace Macrocell (ETM), that allows for real time debug via an external trace port. The ETM has triggering facilities and a FIFO that allow for transfer of both instructions and data through the trace port to an external trace port analyzer hardware without stalling the microprocessor.

Referring to FIG. 1, a block diagram of a conventional apparatus 10 having multiple processors 12A–B and multiple ETMs 14A–B is shown. A very close coupling requirement causes a one-to-one relationship between the embedded processors 12A–B and the ETMs 14A–B. Each ETM 14A–B closely monitors dedicated signals (i.e., PROC_TO_ETM) presented by the associated embedded processor 12A–B to determine the instruction and data traces.

Both the ETMs 14A–B and the processors 12A–B have embedded test access port (TAP) controllers (not shown). The TAP controllers in the ETMs 14A–B and in the processors 12A–B run in parallel. In a multi-processor apparatus 10, the processors 12A–B are serially connected to a scan chain formed among the TAP controllers, with the ETMs 14A–B maintaining the parallel relationship to the processors 12A–B. The resulting scan configuration allows tools like Multi-ICE to communicate with the processors 12A–B and the ETMs 14A–B simultaneously. As a result, the processors 12A–B may be debugged simultaneously via a common JTAG interface.

Due to the close coupling of the ETMs 14A–B with the processors 12A–B and the scan chain requirements of trace port analyzer tools, sharing a single ETM 14A–B among multiple processors 12A–B is not practical. A disadvantage of having an ETM 14A–B for every processor 12A–B is primarily gate count. Each ETM 14A–B requires 30,000 to 70,000 gates. The cost of adding an additional ETM 14 grows linearly with the number of embedded processors 12 in the apparatus 10. If, for example, there are ten processors 12 in the apparatus 10, then 700,000 gates are required for the ten ETMs 14. As a result, the apparatus 10 is too costly to be practical.

SUMMARY OF THE INVENTION

The present invention concerns an apparatus generally comprising a plurality of processors, a trace circuit, and a connector circuit. The trace circuit may be configured to present information at a port for debugging software in a selected processor of the processors. The connector circuit may be configured to (i) couple the trace circuit to the selected processor in response to a select signal and (ii) transfer the information from the selected processor to the trace circuit while the selected processor is executing the software.

The objects, features and advantages of the present invention include providing a method and/or architecture for real time debug via an external trace port that may (i) allow an ETM to be shared among several processors, (ii) maintain a parallel JTAG relationship between the ETM and each processor, (iii) reduce gate count, and/or (iv) allow software to operate while debugging information is extracted.

BRIEF DESCRIPTION OF THE DRAWINGS

These and other objects, features and advantages of the present invention will be apparent from the following detailed description and the appended claims and drawings in which:

FIG. 1 is a block diagram of a conventional apparatus for debugging software in embedded processors;

DETAILED DESCRIPTION OF THE PREFERRED EMBODIMENTS

Figure 2:
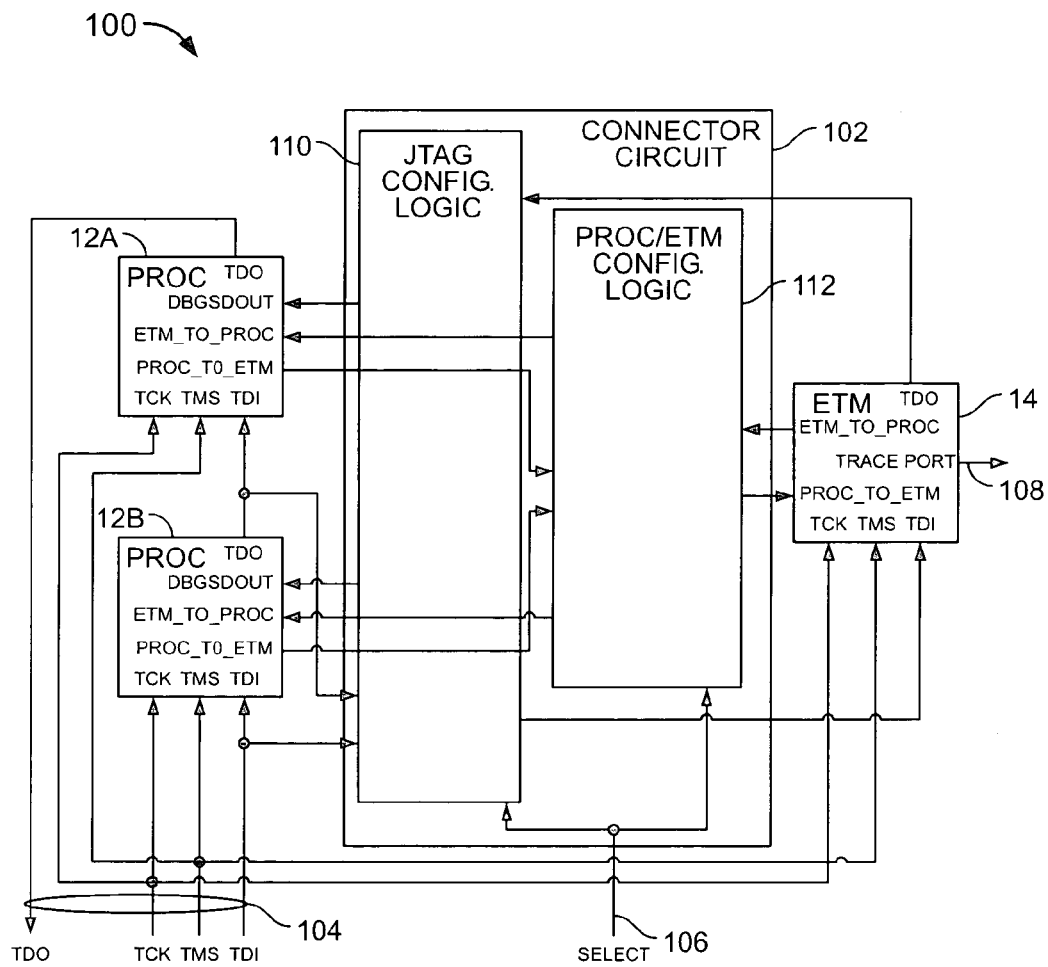
FIG. 2 is a block diagram of a preferred embodiment of the present invention.

Referring to FIG. 2, a block diagram of an apparatus 100 is shown in accordance with a preferred embodiment of the present invention. The apparatus 100 may implement a method for sharing an ETM 14 across two or more processors 12A–B. Debug access via a JTAG interface is generally retained for each processor 12A–B, while an ETM trace capability may be targeted to a selected processor 12 among the processors 12A–B as chosen by a signal (e.g., SELECT). With the invention, 30,000 to 70,000 gates may be saved for each additional processor 12 added to the apparatus 100. The reduction in gate count generally equates to large amounts of cost savings.

The apparatus 100 may maintain the parallel JTAG relationship between the ETM 14 with each processor 12A–B. Therefore, the parallel JTAG relationship generally allows continued access to the processors 12A–B and the ETM 14 regardless of which processor 12A–B is connected to the ETM 14. The ETM 14 may be defined by the Embedded Trace Macrocell Specification, published by ARM Limited, Cambridge, England, and hereby incorporated by reference in its entirety. The Joint Test Action Group (JTAG) architecture may be defined by the IEEE Standard 1149.1-1990, IEEE Standard Test Access Port and Boundary-Scan Architecture, The Institute of Electrical and Electronics Engineering, Inc., New York, N.Y. The IEEE Standard 1149.1-1990 is hereby incorporated by reference in its entirety.

The apparatus 100 generally comprises the processors 12A–B, the ETM 14, and a circuit 102. The apparatus 100 may have an interface 104 for the JTAG interface signals. The apparatus 100 may have an input 106 to receive the signal SELECT. The apparatus 100 may have an output 108 to present a signal (e.g., TRACE_PORT). The apparatus 100 may be implemented as an application specific integrated circuit (ASIC).

The JTAG interface signals generally comprise a signal (e.g., TCK), a signal (e.g., TMS), a signal (e.g., TDI) and a signal (e.g., TDO). The signal TCK may be implemented as a test clock signal received at the interface 104. The signal TMS may be implemented as a test mode select signal received at the interface 104. The signal TDI may be implemented as a test data input signal. The signal TDI may represent an input test data stream for presenting known data to the apparatus 100 for testing. The signal TDO may be implemented as a test data output signal. The signal TDO may represent an output test data stream that presents a test result from the apparatus 100.

The signal TCK received at the interface 104 may be provided to each processor 12A–B and the ETM 14. The signal TMS received at the interface 104 may be provided to each processor 12A–B and the ETM 14. The signal TDI may be received by each processor 12A–B, the circuit 102 and the ETM 14. The signal TDO may be presented by each processor 12A–B, the ETM 14 and the circuit 102.

A last processor (e.g., the processor 12A) in a serial scan chain may present the signal TDO at the interface 104. A first processor (e.g., the processor 12B) in the serial scan chain may receive the signal TDI from the interface 104. The other processors may present the signal TDO to an adjacent processor 12 in the serial scan chain which is received as the signal TDI.

The circuit 102 may direct the signal TDI received by the selected processor 12 to the ETM 14. The ETM 14 may present the signal TDO to the circuit 102. The circuit 102 may direct the signal TDO from the ETM 14 to the selected processor 12 as a signal (e.g., DBGSDOUT).

The signal SELECT may be implemented as a select signal. The signal SELECT may be received by the circuit 102. The signal SELECT may identify the selected processor 12 of the multiple processors 12A–B to be coupled to the ETM 14. The signal SELECT may represent at least as many states as a number of processors 12A–B in the apparatus 100. In one embodiment, the signal SELECT may have a state associated with the processor 12A and another state associated with the processor 12B.

The signal TRACE_PORT may be implemented as an information signal. The signal TRACE_PORT may be presented by the ETM at the output 108. The signal TRACE_PORT may convey information that is generally helpful in understanding the operation of the selected processor 12. The signal TRACE_PORT may provide a real-time trace capability for the selected processor 12 without disrupting the software being executed. The signal TRACE_PORT may be unaffected by the circuit 102. Therefore, the signal TRACE_PORT may be used to debug the software executing on the selected processor 12 the same as in a conventional one-processor-to-one-ETM implementation.

The circuit 102 may be implemented as a connector circuit. The connector circuit 102 may couple the ETM 14 to the selected processor 12 of the processors 12A–B in response to the signal SELECT. The connector circuit 102 may transfer a signal (e.g., ETM_TO_PROC) from the ETM 14 to the selected processor 12. The connector circuit 102 may transfer another signal (e.g., PROC_TO_ETM) from the selected processor 12 to the ETM 14. The connector circuit 102 may transfer the signal TDI from the selected processor 12 to the ETM 14. The connector circuit 102 may transfer the signal TDO from the ETM 14 to the selected processor 12. The signals ETM_TO_PROC and PROC_TO_ETM may each be implemented as several independent signals and/or components of the signals. The ETM Specification generally contains details of the signals exchanged between the processors 12A–B and the ETM 14.

The connector circuit 102 generally comprises a circuit 110 and a circuit 112. The circuit 110 may be implemented as a JTAG configuration logic circuit. The circuit 112 may be implemented as a processor/ETM configuration logic circuit.

The JTAG configuration logic circuit 110 generally routes the signal TDO presented by the ETM 14 to the selected processor 12 as determined by the signal SELECT. The selected processor 112 may receive the signal TDO from the ETM 14 as the signal DBGSDOUT. The JTAG configuration logic circuit 110 may also multiplex the signals TDI received by each of the processors 12A–B to the ETM 14. Multiplexing of the signals TDI may be controlled by the signal SELECT. In particular, the signal SELECT may cause the signal TDI receive by the selected processor 12 to also be received by the ETM 14.

The processor/ETM configuration logic circuit 112 generally routes the signal ETM_TO_PROC to the selected processor 12. The other processors 12A–B may receive the signal ETM_TO_PROC from the processor/ETM configuration logic circuit 112 as a steady-state signal that may not interrupt operations of the processors 12A–B. For example, the steady-state signal may be a predetermined logic state (e.g., a logical one state or a logical zero state).

The processor/ETM configuration logic circuit 112 may multiplex the signals PROC_TO_ETM from the processors 12A–B to the ETM 14. The multiplexing of the signals PROC_TO_ETM may be controlled by the signal SELECT. In particular, the signal PROC_TO_ETM presented by the selected processor 12 may be presented to the ETM 14.

Figure 3:
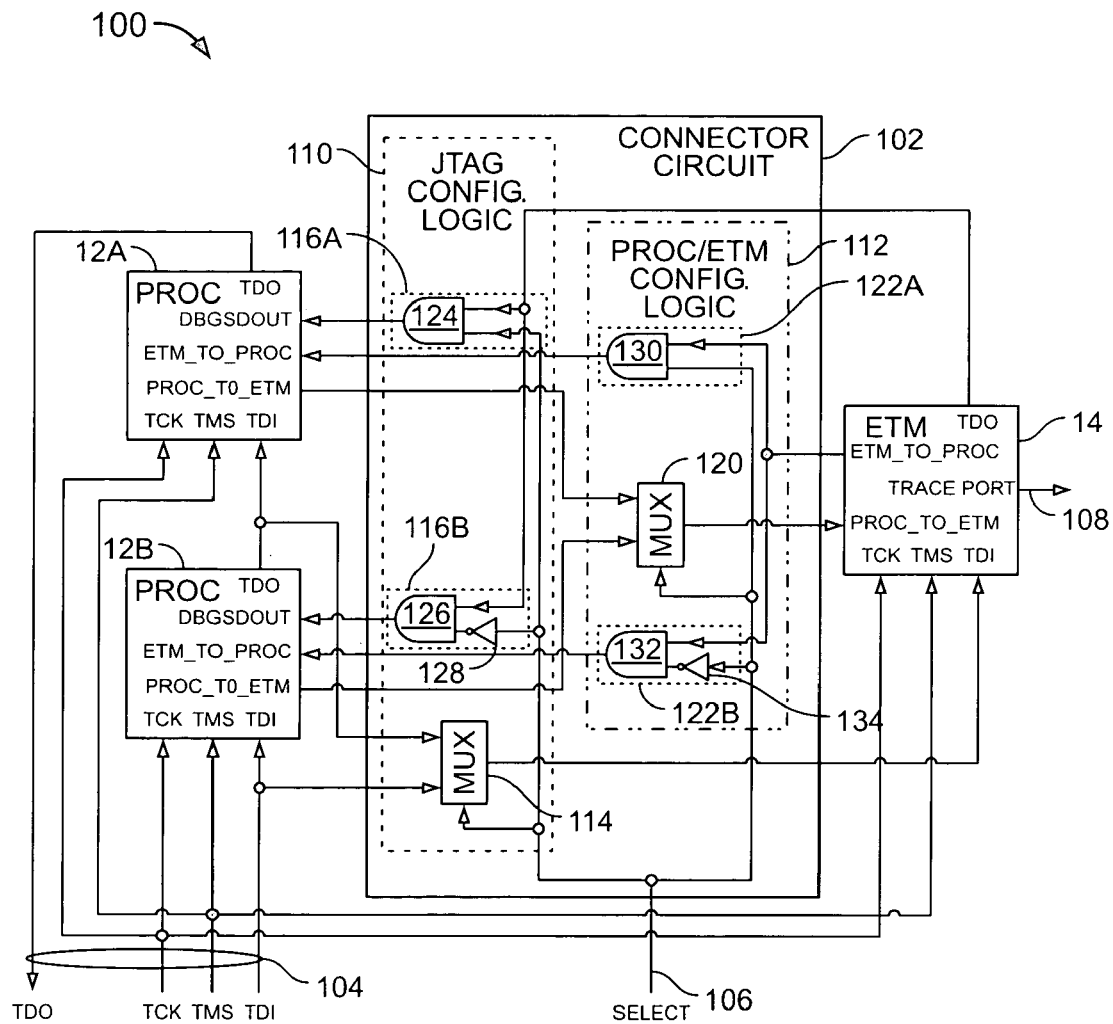
FIG. 3 is a detailed block diagram of the apparatus of FIG. 2.

Referring to FIG. 3, a detailed block diagram of the apparatus 100 is shown. The JTAG configuration logic circuit 110 generally comprises a multiplexer 114 and multiple gates 116A–B. In general, the multiplexer 114 may have an input for each of the processors 12A–B. There may be a gate 116A–B associated with each of the processors 12A–B. The processor/ETM configuration logic circuit 112 generally comprises a multiplexer 120 and multiple gates 122A–B. In general, the multiplexer 120 may have an input for each of the processors 12A–B. There may be a gate 122A–B associated with each of the processors 12A–B.

The multiplexing of the signals TDI to the ETM 14 may be implemented by the multiplexer 114 in response to the signal SELECT. The routing of the signal TDO presented by the ETM 14 may be implemented by the gates 116A–B. The gate 116A may pass or switch the signal TDO to the processor 12A while the gate 116B presents the predetermined logic state to the processor 12B. The gate 116B may pass or switch the signal TDO to the processor 12B while the gate 116A presents the predetermined logic state to the processor 12A. The gates 116A may prevent disruption of the processors 12A–B that are not coupled to the ETM 14 through the JTAG configuration logic circuit 110.

The multiplexing of the signals PROC_TO_ETM to the ETM 14 may be implemented by the multiplexer 120 in response to the signal SELECT. The routing of the signal ETM_TO_PROC presented by the ETM 14 may be implemented by the gates 122A–B. The gate 122A may pass or switch the signal ETM_TO_PROC to the processor 12A while the gate 122B presents a predetermined logic state to the processor 12B. The gate 122B may pass or switch the signal ETM_TO_PROC to the processor 12B while the gate 122A presents the predetermined logic state to the processor 12A. The gates 122A may prevent disruption of the processors 12A–B that are not coupled to the ETM 14 through the processor/ETM configuration logic circuit 112.

The gate 116A may be implemented as a logical gate 124. The logic gate 124 may perform a logical AND operation on the signal SELECT and the signal TDO to present the signal DBGSDOUT to the processor 12A. The gate 116B may be implemented as a logical gate 126. The logical gate 126 may perform a logical AND operation on the signal TDO and an inverse of the signal SELECT to present the signal DBGSDOUT to the processor 12B. The inverse of the signal SELECT may be achieved with an inverter 128 or an inverting input on the logic gate 126.

The gate 122A may be implemented as a set of logic gates 130, one per component of the signal ETM_TO_PROC. The logic gates 130 may perform a logical AND operation on the signal SELECT and the individual components of the signal ETM_TO_PROC to present the signal ETM_TO_PROC to the processor 12A. The gate 122B may be implemented as a set of logical gates 132, one per component of the signal ETM_TO_PROC. The logical gates 132 may perform a logical AND operation on each individual component of the signal ETM_TO_PROC and an inverse of the signal SELECT to present the signal ETM_TO_PROC to the processor 12B. The inverse of the signal SELECT may be achieved with an inverter 134 or an inverting input on the logic gate 132. Other designs may be used to implements the gates 116A–B and 122A–B to meet the design criteria of a particular application.

Different relationships between the number of processors 12A–B and the number of ETMs 14 may be implemented. For example, an apparatus 100 comprising four processors 12 may have a single ETM 14, two ETMs 14 or three ETMs 14. Some processors 12 within the apparatus 100 may have a dedicated ETM 14 while other processors 12 share common ETMs 14.

Various mechanisms may be employed to generate the signal SELECT. For example, signal SELECT may be controlled by a dedicated input, an internal register and/or internal decode logic. In designs incorporating multiple shared ETMs 14, the signal SELECT may be implemented as a single signal or multiple independent signals. Furthermore, the signal SELECT may be implemented as multiple independent signals for each ETM 14. For example, the processor 12 to ETM 14 signals may be controlled by a first portion of the signal SELECT while the JTAG interconnect may be controlled independently by a second portion of the signal SELECT. Other variations of the signal SELECT may be implemented to meet the design criteria of a particular application.

In one embodiment, the ETM 14 to processor 12 signals may not be enabled/disabled by the gates 122A–B. Each processor 12 may present debug information to the processor/ETM configuration logic circuit 112 in parallel. The processor/ETM configuration logic circuit 112 may then select on debug information from the selected processor 12 and disregard the rest of the debug information from the other processors 12A–B.

The JTAG interconnect may consist of a single or multiple serial scan chains. The JTAG signals for the individual ETMs 14 and processors 12 may be pinned out of the apparatus 100, so that a single or multiple JTAG serial scan chains may be configured external to the apparatus 100. The JTAG serial scan chains may include additional TAP controllers, associated with devices (not shown) that do not make use of the shared ETMs 14.

The present invention may also be implemented by the preparation of ASICs, FPGAs, or by interconnecting an appropriate network of conventional component circuits (such as conventional circuit implementing a state machine), as is described herein, modifications of which will be readily apparent to those skilled in the art(s).

The various signals of the present invention may be implemented as single-bit or multi-bit signals in a serial and/or parallel configuration.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a plurality of processors;
   a trace circuit configured to present information at a port for debugging software in a selected processor of said processors;
   a first circuit configured to (i) couple said trace circuit to said selected processor in response to a select signal, (ii) transfer said information from said selected processor to said trace circuit while said selected processor is executing said software, (iii) transfer data from said trace circuit to said selected processor and (iv) present a first predetermined logic state to said processors other than said selected processor;
   a second circuit configured to (i) transfer a first test data stream received by said selected processor to said trace circuit, (ii) transfer a second test data stream from said trace circuit to said selected processor and (iii) present a second predetermined logic state to said processors other than said selected processor; and
   a boundary scan chain connected to each of said processors and said trace circuit.

2. The apparatus according to claim 1, wherein said second circuit is further configured to transfer said first test data stream received by said selected processor through said boundary scan chain to said trace circuit.

3. The apparatus according to claim 1, wherein said second circuit is further configured to transfer said second test data stream from said trace circuit through said boundary scan chain to said selected processor.

4. An apparatus comprising:
   a plurality of processors;
   a trace circuit configured to present information at a port for debugging software in a selected processor of said processors;
   a first multiplexer configured to (i) couple said trace circuit to said selected processor in response to a select signal and (ii) multiplex said information from said processors to said trace circuit in response to said select signal while said selected processor is executing said software;
   a first plurality of gates each coupled to one of said processors and configured to (i) transfer data selected by said select signal and (ii) present a first predetermined logic state while not selected by said select signal; and
   a boundary scan chain connected to each of said processors and said trace circuit.

5. The apparatus according to claim 4, further comprising:
   a second multiplexer configured to multiplex a plurality of first test data streams received by said processors to said trace circuit in response to said select signal; and
   a second plurality of gates each coupled to one of said processors and configured to (i) transfer a second test data stream while selected by said select signal and (ii) present a second predetermined logic state while not selected by said select signal.

6. The apparatus according to claim 4, wherein each of said gates comprises a logical AND gate having at least one input configured to receive said select signal.

7. A method for debugging software in a selected processor of a plurality of processors, comprising the steps of:
   (A) coupling a trace circuit to said selected processor in response to a select signal;

(B) transferring information from said selected processor to said trace circuit while said selected processor is executing said software;
(C) presenting said information received by said trace circuit at a port;
(D) connecting said processors and said trace circuit through a boundary scan chain;
(E) transfer a first test data stream received by said selected processor to said trace circuit;
(F) transfer a second test data stream from said trace circuit to said selected processor; and
(G) presenting a first predetermined logic state to said processors other than said selected processor in response to transferring said second test data stream.

8. The method according to claim 7, further comprising the steps of transferring data from said trace circuit to said selected processor.

9. The method according to claim 7, further comprising the step of presenting a second predetermined logic state to said processors other than said selected processor in response to transferring said second test data stream.

10. The method according to claim 7, wherein said step of transferring said information comprises the sub-step of multiplexing said information in response to said select signal.

11. The method according to claim 7, wherein said step of transferring said second test data stream comprises the sub-step of gating said second test data stream in response to said select signal.

12. The method according to claim 7, wherein said step of transferring said first test data stream comprises the sub-step of multiplexing said first test data stream in response to said select signal.

13. The method according to claim 12, wherein said step of transferring said second test data stream comprises the sub-step of gating said second test data stream in response to said select signal.

14. An apparatus comprising:
means for coupling a trace circuit to a selected processor of a plurality of processors in response to a select signal;
means for transferring information from said selected processor to said trace circuit while said selected processor is executing software;
means for presenting said information received by said trace circuit at a port;
boundary scan means connected to said processors and said trace circuit;
means for transfer a first test data stream received by said selected processor to said trace circuit;
means for transfer a second test data stream from said trace circuit to said selected processor; and
means for presenting a predetermined logic state to said processors other than said selected processor in response to transferring said second test data stream.

15. The circuit according to claim 1, wherein said processors, said trace circuit, said first circuit and said second circuit are embedded in a single integrated circuit.

\* \* \* \* \*